(12) United States Patent
Kajino

(10) Patent No.: US 10,843,604 B2
(45) Date of Patent: Nov. 24, 2020

(54) VEHICLE SEAT

(71) Applicant: TOYOTA BOSHOKU KABUSHIKI KAISHA, Aichi (JP)

(72) Inventor: Yusuke Kajino, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 57 days.

(21) Appl. No.: 16/029,899

(22) Filed: Jul. 9, 2018

(65) Prior Publication Data

US 2019/0039490 A1 Feb. 7, 2019

(30) Foreign Application Priority Data

Aug. 4, 2017 (JP) .................. 2017-151709

(51) Int. Cl.
*B60N 2/70* (2006.01)
*F16F 7/104* (2006.01)

(52) U.S. Cl.
CPC ............ *B60N 2/7094* (2013.01); *F16F 7/104* (2013.01); *F16F 2228/066* (2013.01); *F16F 2228/08* (2013.01); *F16F 2232/08* (2013.01)

(58) Field of Classification Search
CPC .............................. B60N 2/7094; F16F 7/104
See application file for complete search history.

(56) References Cited

U.S. PATENT DOCUMENTS

| 9,045,058 | B2 | 6/2015 | Katoh et al. | |
|---|---|---|---|---|
| 9,950,646 | B2 * | 4/2018 | Katoh .................. | B60N 2/666 |
| 2014/0191550 | A1 | 7/2014 | Katoh et al. | |
| 2015/0367756 | A1 | 12/2015 | Katoh et al. | |

FOREIGN PATENT DOCUMENTS

| CN | 105313735 | 2/2016 |
|---|---|---|
| EP | 2957459 | 12/2015 |
| WO | 2013/021497 | 2/2013 |

OTHER PUBLICATIONS

German Office Action, dated Jul. 3, 2020, in German patent application No. 10 2018 210 547.2, along with English translation thereof.
Chinese Official Action, issued in Chinese Patent Application No. 201810841275.6, dated Aug. 4, 2020, together with English translation thereof.

* cited by examiner

*Primary Examiner* — Anthony D Barfield
(74) *Attorney, Agent, or Firm* — Greenblum & Bernstein, P.L.C.

(57) ABSTRACT

Provided is a vehicle seat that facilitates setting of a starting load of a movable member. The vehicle seat includes a movable mechanism including: first and second springs coupled to a frame; a movable member displaceable relative to the frame; a first passive member and a second passive member coupled with the respective first and second springs; and a restriction member configured to restrict displacement of the first and second passive members. The movable member displaces the first passive member in a first direction when the movable member is displaced in the first direction, and displaces the second passive member in a second direction when the movable member is displaced in the second direction. The restriction member restricts displacement of the first passive member from a first-passive-member initial position in the second direction and displacement of the second passive member from a second-passive-member initial position in the first direction.

17 Claims, 6 Drawing Sheets

← D2    D1 →

VEHICLE SEAT

CROSS-REFERENCE TO RELATED APPLICATIONS

This application claims the benefit of Japanese Patent Application No. 2017-151709 filed on Aug. 4, 2017 with the Japan Patent Office, the entire disclosure of which is incorporated herein by reference.

BACKGROUND

The present disclosure relates to a vehicle seat.

Among seats to be arranged in a vehicle, such as an automobile, there is publicly known a seat in which a seat cushion or a seatback is displaceable relative to a frame fixed to a vehicle depending on a posture of an occupant (see WO2013/021497).

In the aforementioned seat, elastic support by a spring may be used as a configuration to support the seat cushion or the seatback as a movable member in a displaceable manner. Elastically supporting the movable member by the spring enables displacement of the movable member in response to a load and returning of the movable member to its initial position when the load is released.

SUMMARY

FIGS. 5A, 5B, and 6 illustrate prior art including a movable member 108, a first spring 107A, and a second spring 107B.

When the movable member is supported by a single spring, even a slight vibration may displace the spring and the movable member, which results in unstable movement of the seat. In other words, it is impossible to set a starting load (that is, an initial load) of the movable member.

Also, in a case where the two springs 107A and 107B support the movable member 108 by holding the movable member 108 therebetween, as shown in FIGS. 5A and 5B, a relationship between a displacement (that is, a distance from an initial position) x of the movable member 108 and a load F is indicated as in FIG. 6. As shown in FIG. 6, in a configuration of FIGS. 5A and 5B, elastic forces of the springs 107A and 107B compensate for each other, and the initial load is zero at the initial position (that is, at a balanced position where x=0). Thus, it is impossible also in this case to set the starting load of the movable member 108.

In one aspect of the present disclosure, it is preferable to provide a vehicle seat that facilitates setting of a starting load of a movable member.

One embodiment of the present disclosure is a vehicle seat that comprises a seat cushion, a seatback, and a frame supporting the seat cushion and the seatback. The vehicle seat comprises a movable mechanism configured to support at least a part of the seat cushion or at least a part of the seatback so as to be displaceable relative to the frame. The movable mechanism comprises a first spring and a second spring, each having a first end coupled to the frame; a movable member coupled to the at least a part of the seat cushion or the at least a part of the seatback and configured to be displaceable relative to the frame; a first passive member and a second passive member, a second end of the first spring being coupled to the first passive member and a second end of the second spring being coupled to the second passive member; and a restriction member configured to restrict displacement of the first passive member and the second passive member. The movable member is configured to displace the first passive member in a first direction when the movable member is displaced from a movable-member initial position in the first direction, and to displace the second passive member in a second direction, which is opposite to the first direction, when the movable member is displaced from the movable-member initial position in the second direction. The restriction member is configured to restrict displacement of the first passive member from a first-passive-member initial position in the second direction, and to restrict displacement of the second passive member from a second-passive-member initial position in the first direction.

With such configuration, when the movable member is displaced from the movable-member initial position, a load is applied to only one of the first passive member and the second passive member; thus, the movable member receives an elastic force from only one of the first and second springs. Thus, it is possible to set a starting load of the movable member based on the elastic force of the single spring.

Accordingly, the starting load of the movable member can be easily adjusted by providing the movable member with a restoring force toward the movable-member initial position by the first and second springs, and adjusting the distance between the restriction member and the first end of each of the first and second springs (in other words, the initial length of each of the first and second springs).

In one embodiment of the present disclosure, the first spring may be configured to expand due to the displacement of the first passive member from the first-passive-member initial position, and the second spring may be configured to expand due to the displacement of the second passive member from the second-passive-member initial position. With such configuration, it is possible to avoid a risk of buckling due to compression of the first or second spring. Thus, an increased reliability of the movable mechanism can be achieved.

In one embodiment of the present disclosure, the restriction member may be a part of the frame. With such configuration, the movable mechanism may be configured with less components.

BRIEF DESCRIPTION OF THE DRAWINGS

Example embodiments of the present disclosure will be described hereinafter with reference to the accompanying drawings, in which.

DETAILED DESCRIPTION OF THE PREFERRED EMBODIMENTS

1. First Embodiment

FIGS. 1, 2A, 2B, and 3 illustrate a first embodiment that uses a compressed spring to push a movable member towards an initial position of the movable member.

1-1. Configuration

Figure 1:
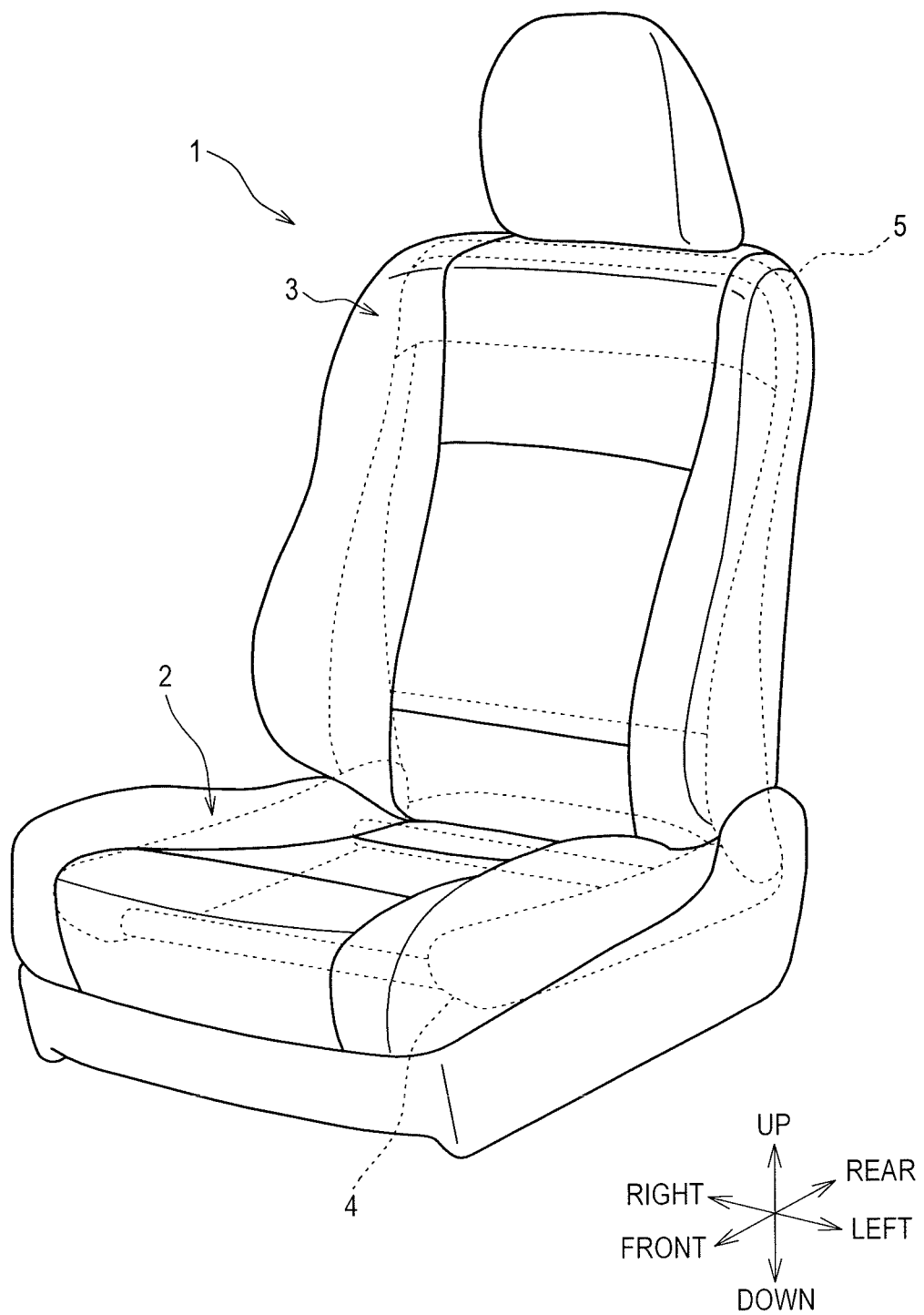
FIG. 1 is a schematic perspective view showing a vehicle seat of an embodiment.

FIG. 1 is a schematic perspective view showing a vehicle seat of an embodiment. In FIG. 1, the vehicle seat 1 comprises a seat cushion 2, a seatback 3, a cushion frame 4 that supports the seat cushion 2, and a back frame 5 that supports the seatback 3. The vehicle seat 1 of the present embodiment is used as a sitting seat for a passenger car. Each direction in the description below and the drawings means a direction in a state where the vehicle seat 1 is assembled to a vehicle (that is, a passenger car). Also, in the present embodiment, a seat width direction coincides with a right-left direction of the vehicle, and a seat front side coincides with a front side of the vehicle. The seat cushion 2 is a portion to support an occupant's buttocks and therearound. The seatback 3 is a portion to support the occupant's back and is pivotable in a seat front-rear direction relative to the seat cushion 2.

Figure 2A:
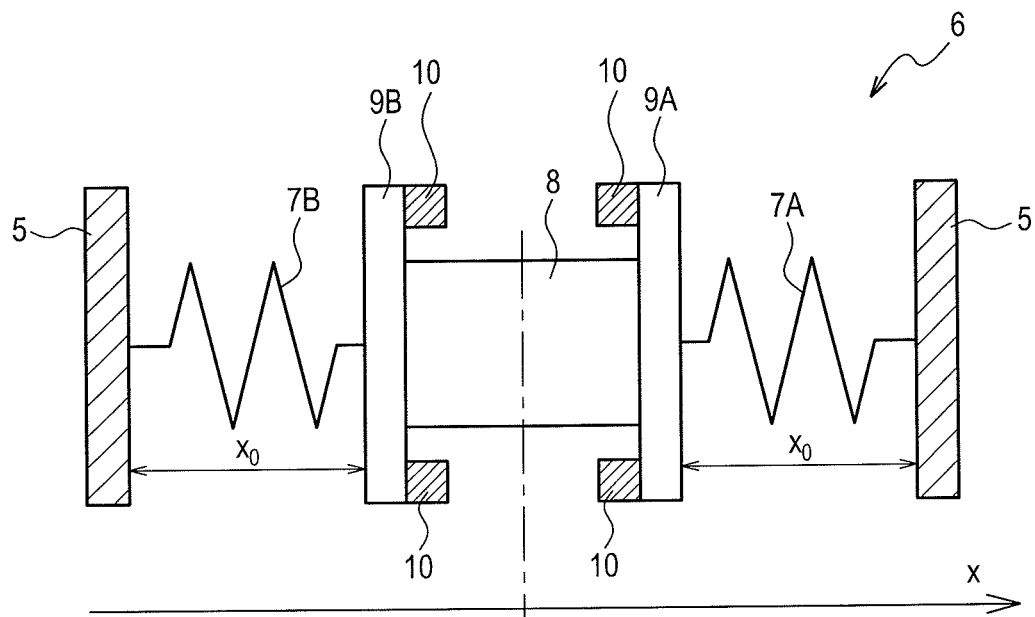
FIG. 2A is a schematic diagram showing a configuration of a movable mechanism in the vehicle seat of FIG. 1.

FIG. 2A is a schematic diagram showing a configuration of a movable mechanism in the vehicle seat of FIG. 1. The vehicle seat 1 also comprises a movable mechanism 6 shown in FIG. 2A.

<Movable Mechanism>

In FIG. 2A, the movable mechanism 6 is configured to support at least a part (that is, a portion to be displaced) of the seatback 3 so as to be displaceable relative to the back frame 5. The movable mechanism 6 comprises a first spring 7A and a second spring 7B, a movable member 8, a first passive member 9A and a second passive member 9B, and a restriction member 10.

<<Spring>>

The first spring 7A and the second spring 7B each comprise, for example, a coil spring.

A first end of the first spring 7A and a first end of the second spring 7B are coupled to different positions of the back frame 5. That is, the respective first ends of the first spring 7A and the second spring 7B are fixed to the back frame 5. A second end of the first spring 7A and a second end of the second spring 7B are coupled to the below-described first passive member 9A and second passive member 9B, respectively. The "first ends" may be described as fixed ends. The "second ends" may be described as movable ends.

The first spring 7A and the second spring 7B are preferably arranged symmetrically to each other with respect to the movable member 8 located therebetween. The first spring 7A is arranged on a first direction D1 side (e.g., a right side) of the movable member 8, and the second spring 7B is arranged on a second direction D2 side (e.g., a left side) of the movable member 8. Directions D1 and D2 may also refer to a front side and a rear side, with respect to a person sitting in the vehicle seat.

In the first embodiment, the first spring 7A and the second spring 7B preferably have the same spring constant (k) and same natural length (i.e., xL, not shown, a length when no load is applied). Also, the first spring 7A and the second spring 7B are each configured to have a length of x0 in a state where the movable member 8 is in a movable-member initial position shown in FIG. 2A.

Figure 2B:
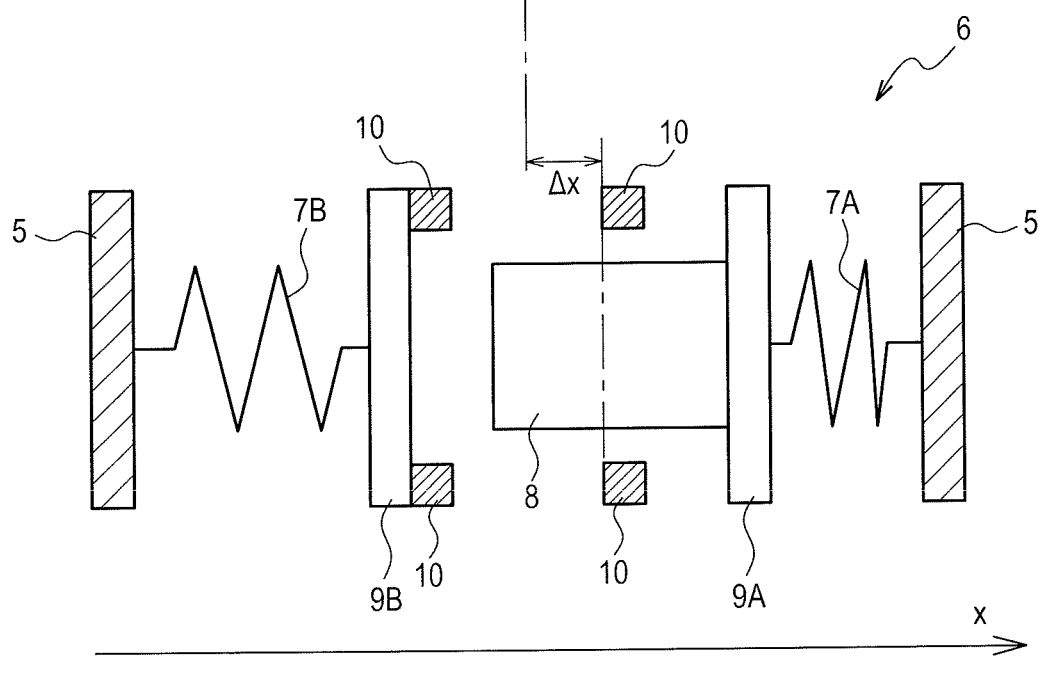
FIG. 2B is a schematic diagram showing a state where a movable portion is displaced in the movable mechanism of FIG. 2A and compresses a spring.

FIG. 2B is a schematic diagram showing a state where a movable portion is displaced in the movable mechanism of FIG. 2A. As shown in FIG. 2B, the first spring 7A and the second spring 7B are arranged such that, when the movable member 8 detailed below is displaced from the movable-member initial position along an x-axis (that is, rightward or leftward in FIGS. 2A and 2B), one of the first spring 7A and the second spring 7B contracts.

Specifically, when the movable member 8 is displaced in the first direction D1, only the first spring 7A contracts from its initial state to have a length less than x0 (and the second spring 7B remains in its initial state). In contrast, when the movable member 8 is displaced in the second direction D2, only the second spring 7B contracts from its initial state to have a length less than x0 (and the first spring 7A remains in its initial state).

<<Movable Member>>

The movable member 8 is coupled to part of the seatback 3. Also, the movable member 8 is configured to be displaceable relative to the back frame 5. Accordingly, displacement of the movable member 8 causes at least a part of the seatback 3 to be displaced relative to the back frame 5. The movable member 8 can move independently of the back frame 5.

As shown in FIG. 2A, the movable member 8 is arranged along the x-axis between the first passive member 9A and the second passive member 9B as detailed below. In the first embodiment, the movable member 8 is configured to be displaceable in the first direction D1 and in the second direction D2 from the movable-member initial position shown in FIG. 2A.

<<Passive Member>>

The second end (movable end) of the first spring 7A is coupled to the first passive member 9A, and the second end (movable end) of the second spring 7B is coupled to the second passive member 9B.

The first passive member 9A is displaced along the x-axis in response to the expansion and contraction of the first spring 7A. The second passive member 9B is arranged in a position to face the first passive member 9A with the movable member 8 located therebetween, and is displaced along the x-axis in response to the expansion and contraction of the second spring 7B.

<<Restriction Member>>

The restriction member 10 is configured to restrict displacement of the first and second passive members 9A, 9B. In the first embodiment, the restriction member 10 is a part of the back frame 5. However, the restriction member 10 may be a member fixed to the back frame 5. The restriction member 10 does not move relative to the back frame 5.

The restriction member 10 is configured to restrict displacement of the first passive member 9A from a first-passive-member initial position in the second direction D2, and to restrict displacement of the second passive member 9B from a second-passive-member initial position in the first direction D1. Specifically, the restriction member 10 is provided in a position to abut a portion of the first passive member 9A facing the second direction D2, thereby defining the first-passive-member initial position of the first passive member 9A. The restriction member 10 is also provided in a position to abut a portion of the second passive member 9B facing the first direction D1, thereby defining the second-passive-member initial position of the second passive member 9B.

The restriction member 10 is arranged to not restrict displacement of the movable member 8, the first spring 7A, or the second spring 7B. In other words, the restriction member 10 is not present within a movable range of the movable member 8, the first spring 7A, or the second spring 7B.

<<Operation of Movable Mechanism>>

FIG. 2A, shows the state where the movable member 8 is in the movable-member initial position, and the first passive member 9A and the second passive member 9B are pressed against the restriction member 10 by the first spring 7A and the second spring 7B, respectively. In this case, the movable member 8 in the movable-member initial position receives no elastic force of the first spring 7A or the second spring 7B.

The movable member 8 in the movable-member initial position may abut the first passive member 9A and the second passive member 9B as shown in FIG. 2A, or may be separate from the first passive member 9A and the second passive member 9B.

If the first and second springs 7A, 7B each have an initial length (that is, a length in the state where the movable member 8 is in the movable-member initial position) of x0, a natural length of xL (not shown), and a spring constant of k, then a load of k·(xL−x0) toward the movable member 8 is applied to the first passive member 9A in the first-passive-member initial position and the second passive member 9B in the second-passive-member initial position, respectively.

Figure 3:
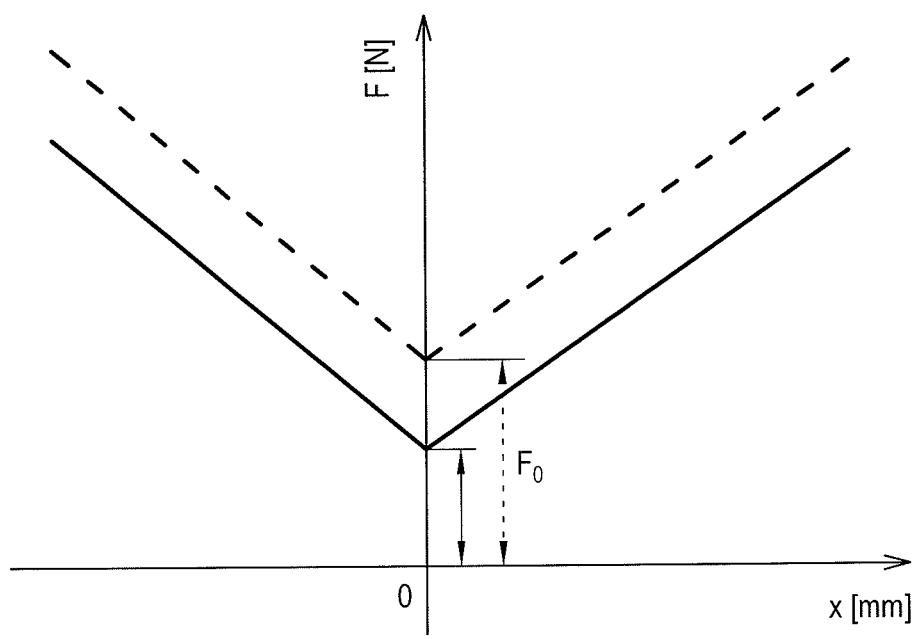
FIG. 3 is one example of a load-position line diagram showing a relationship between the displacement of the movable portion in the movable mechanism of FIG. 2A and a load.

In FIG. 3, an initial load F0 of the movable mechanism 6 is k·(xL−x0). When a load in the first direction D1 or the second direction D2 that is greater than the initial load F0 is applied to the movable member 8, the movable member 8 is displaced in the direction of the load.

FIG. 2B shows a first state where the movable member 8 is displaced from the movable-member initial position in the first direction D1, and the movable member 8 causes the first passive member 9A to be displaced from the first-passive-member initial position in the first direction D1, thereby compressing the first spring 7A. In a second state (not shown) where the movable member 8 is displaced from the movable-member initial position in the second direction D2, the movable member 8 causes the second passive member 9B to be displaced from the second-passive-member initial position in the second direction D2, thereby compressing the second spring 7B.

FIG. 2B shows the first state where the movable member 8 is displaced in the first direction D1. In the first state of FIG. 2B, an elastic force of the first spring 7A, that is, a load in a direction along the x-axis to be applied to the movable member 8 is k·(xL−x0−Δx).

In FIG. 3, as the displacement (that is, a distance from the movable-member initial position) x of the movable member 8 in the first direction D1 or the second direction D2 becomes greater, a load F required to displace the movable member 8 becomes greater. When the load applied to the movable member 8 becomes less, the movable member 8 is returned toward the movable-member initial position by the elastic force stored in the first spring 7A or the second spring 7B.

The initial load F0 may be adjustable by changing the initial length x0 of the first and second springs 7A, 7B. For example, the initial load F0 may be adjustable by changing a position of the restriction member 10 on the x-axis, or by changing a coupling position between each of the first and second springs 7A, 7B and the back frame 5. Adjustment of the initial load F0 results in, for example, a shift of a load-position line from a solid line to a broken line as shown in FIG. 3.

Returning to FIGS. 2A and 2B, the restriction member 10 may be configured to be changeable in position manually, or may be configured to be changeable in position automatically, for example, by an actuator.

Also, the initial load F0 may be adjustable by changing properties, such as the spring constant k and the natural length xL, of the first and second springs 7A, 7B; however, changing the position of the restriction member 10 is easiest.

1-2. Effects

According to the embodiment detailed above, the following effects can be obtained:

(1a) When the movable member 8 is displaced from the movable-member initial position, the load is applied to only one of the first passive member 9A and the second passive member 9B; thus, the movable member 8 receives the elastic force of only one of the first and second springs 7A, 7B. Accordingly, it is possible to set a starting load of the movable member 8 based on the elastic force of the single spring.

Thus, the starting load of the movable member 8 can be easily adjusted by adjusting a distance between the restriction member 10 and the first end of each of the first and second springs 7A, 7B (in other words, the initial length x0 of each of the first and second springs 7A, 7B), while providing the movable member 8 with a restoring force toward the movable-member initial position by the first and second springs 7A, 7B.

(1b) Since the restriction member 10 is configured as a part of the back frame 5, the movable mechanism 6 can be configured with less components, and an increased strength of the restriction member 10 can be achieved.

2. Second Embodiment

FIGS. 1, 4A, 4B, and 5 illustrate a second embodiment wherein the movable member includes an opening, and wherein an expanded spring pulls a movable member towards an initial position of the movable member. Using the expanded spring avoids a failure mechanism caused by a buckled compressed spring.

2-1. Configuration

Figure 4A:
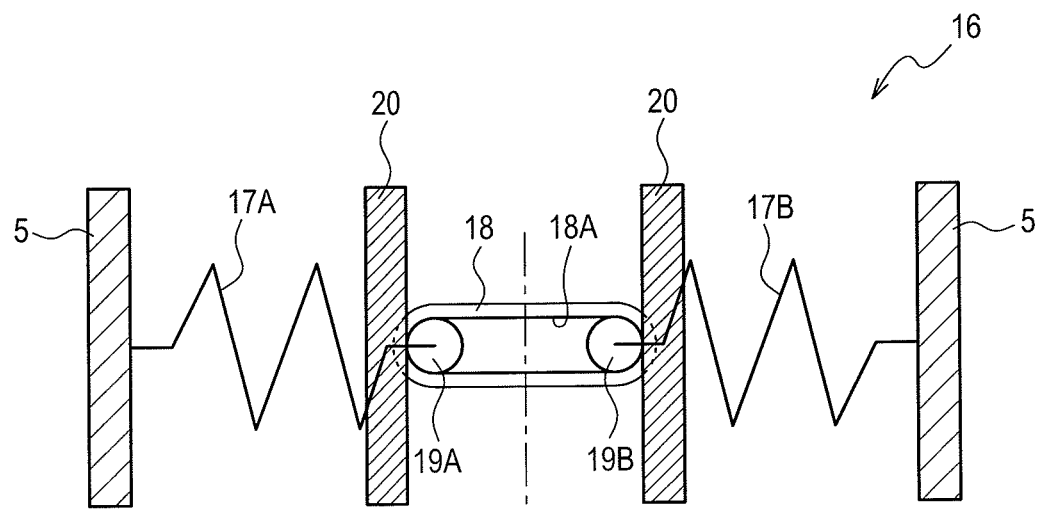
FIG. 4A is a schematic diagram showing a configuration of a movable mechanism in a different embodiment from that of FIG. 2A.
Figure 4B:
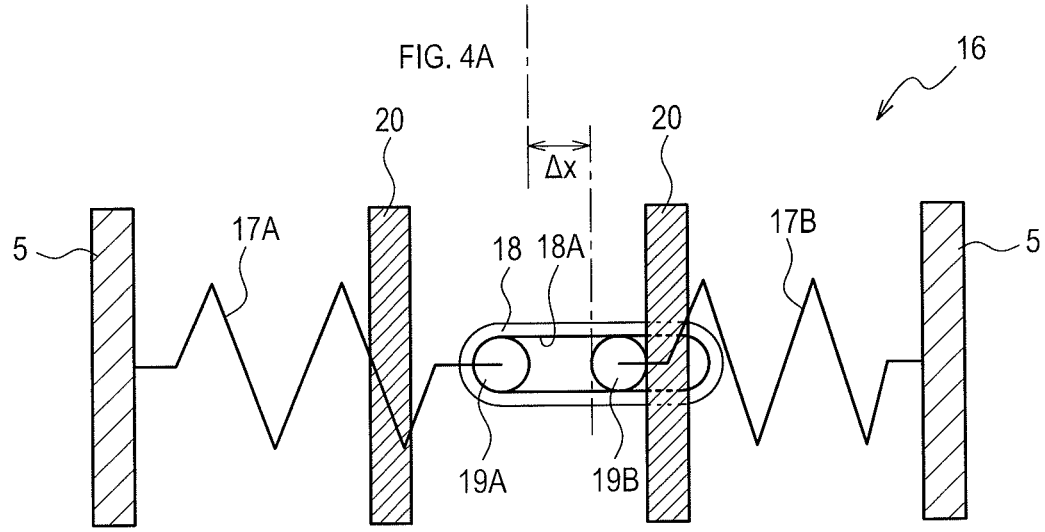
FIG. 4B is a schematic diagram showing a state where a movable portion is displaced in the movable mechanism of FIG. 4A and expands a spring.
Figure 5A:
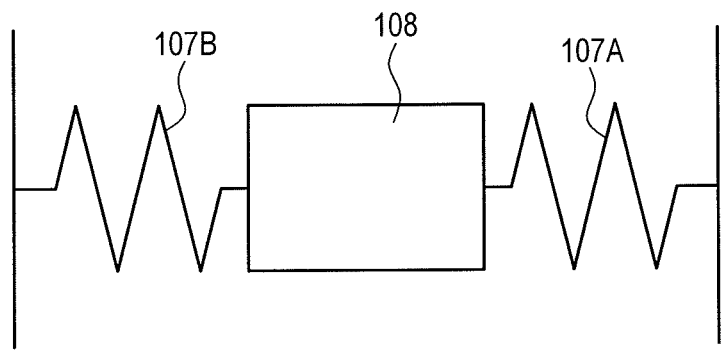
FIG. 5A is a schematic diagram showing a configuration of a movable mechanism in a conventional vehicle seat.
Figure 5B:
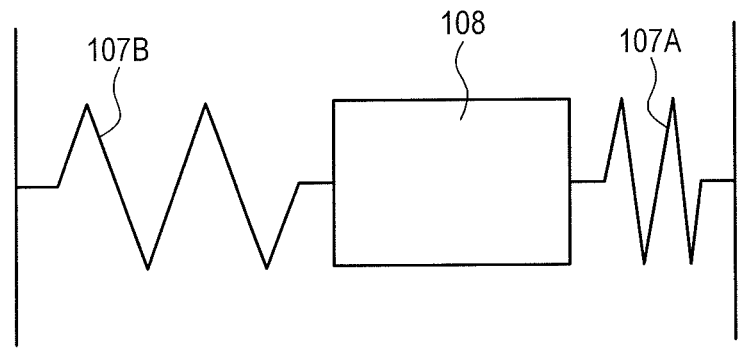
FIG. 5B is a schematic diagram showing a state where a movable portion is displaced in the movable mechanism of FIG. 5A.
Figure 6:
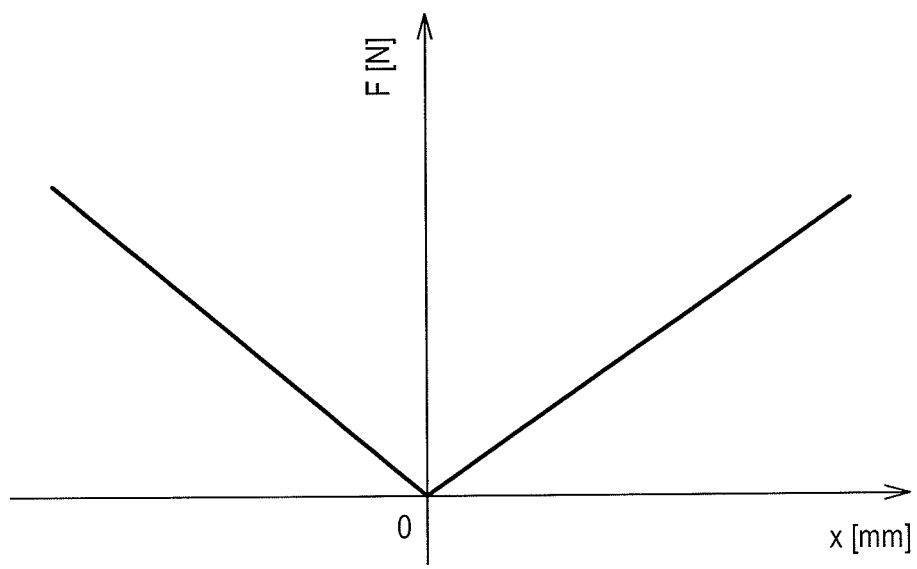
FIG. 6 is a load-position line diagram in the movable mechanism of FIG. 5A.

FIG. 4B is a schematic diagram showing a state where a movable portion is displaced in the movable mechanism of FIG. 4A and expands a spring. A movable mechanism 16 shown in FIG. 4A is provided to the vehicle seat 1 of FIG. 1 in place of the movable mechanism 6 of FIG. 2A. The movable mechanism 16 comprises a first spring 17A and a second spring 17B, a movable member 18 (with an opening 18A), a first passive member 19A and a second passive member 19B, and a restriction member 20.

<<Spring>>

The first spring 17A and the second spring 17B are similar to the first spring 7A and the second spring 7B of FIG. 2A, except for having respective second ends coupled to the first passive member 19A and second passive member 19B described below.

As shown in FIG. 4A, the first spring 17A and the second spring 17B are arranged such that one of the first and second springs 17A, 17B expands when the movable member 18 described below is displaced from a movable-member initial position along an x-axis (that is, displaced rightward or leftward in FIGS. 4A and 4B).

FIG. 4B is a schematic diagram showing a state where a movable portion is displaced in the movable mechanism of FIG. 4A and expands a spring. Specifically, when the movable member 18 is displaced in a first direction D1, only the first spring 17A expands from its initial state to have a length greater than an initial length. When the movable member 18 is displaced in a second direction D2 (not shown), only the second spring 17B expands from its initial state to have a length greater than the initial length.

<<Movable Member>>

The movable member 18 is coupled to the seatback 3, and is displaceable relative to the back frame 5.

In FIGS. 4A and 4B, the movable member 18 comprises an opening 18A, which extends along the x-axis. A first passive member 19A and a second passive member 19B described below are arranged in the opening 18A.

<<Passive Member>>

The second end of the first spring 17A is coupled to the first passive member 19A, and the second end of the second spring 17B is coupled to the second passive member 19B.

The first passive member 19A and the second passive member 19B each penetrate the opening 18A of the movable member 18. The second passive member 19B is arranged in a position shifted in the first direction D1 relative to the first passive member 19A. The first passive member 19A and the second passive member 19B are each configured to be slidable in the opening 18A along the x-axis. In other words, the movable member 18 is configured to be displaceable along the x-axis while holding the first and second passive members 19A, 19B in the opening 18A.

In FIG. 4A, when the movable member 18 is located in the movable-member initial position, the first and second passive members 19A, 19B are located at opposite ends of the opening 18A along the x-axis. Specifically, the first passive member 19A abuts an edge of the opening 18A on a second direction D2 side, and the second passive member 19B abuts an edge of the opening 18A on a first direction D1 side.

In FIG. 4B, the first passive member 19A is displaced together with the opening 18A of the movable member 18 in a direction along the x-axis in response to expansion or contraction of the first spring 17A as shown. The second passive member 19B is displaced (not shown) together with the opening 18A of the movable member 18 in a direction along the x-axis in response to expansion or contraction of the second spring 17B.

<<Restriction Member>>

The restriction member 20 is configured to restrict displacement of the first and second passive members 19A, 19B. In the present embodiment, the restriction member 20 is a part of the back frame 5. However, the restriction member 20 may be a member fixed to the back frame 5.

The restriction member 20 is configured to restrict displacement of the first passive member 19A from the first-passive-member initial position in the second direction D2 and displacement of the second passive member 19B from the second-passive-member initial position in the first direction D1. In FIG. 4A, the restriction member 20 is provided in a position to abut a left portion, which faces the second direction D2, of the first passive member 19A penetrating the opening 18A of the movable member 18, and in a position to abut a right portion, which faces the first direction D1, of the second passive member 19B.

Also, the restriction member 20 is arranged not to restrict displacement of the movable member 18, the first spring 17A, or the second spring 17B. In other words, the restriction member 20 is not present within a movable range of the movable member 18, the first spring 17A, or the second spring 17B.

As shown in FIG. 4B, when the movable member 18 is displaced from the movable-member initial position in the first direction D1, the first passive member 19A is displaced in the first direction D1 while abutting the left edge of the opening 18A, thereby pulling (and expanding) the first spring 17A. In contrast, the second passive member 19B, which is restricted by the restriction member 20 from being displaced in the first direction D1, is only relatively moved in the second direction D2 with respect to the opening 18A, but without any change in absolute position on the x-axis. Thus, the second spring 17B is not deformed.

When the movable member 18 is displaced from the movable-member initial position in the second direction D2 (not shown), only the second passive member 19B is displaced (leftward) according to the same principle, and the first passive member 19A is not displaced. That is, only the second spring 17B is pulled and expanded.

2-2. Effects

According to the second embodiment, the following effects can be obtained:

(2a) Since a restoring force is obtained by the pulling (expanding) of the first or second spring 17A, 17B, it is possible to avoid a risk of buckling due to compression of the first or second spring 17A, 17B. Thus, an increased reliability of the movable mechanism 16 can be achieved.

3. Other Embodiments

Although some embodiments of the present disclosure have been described above, it is to be understood that the present disclosure is not limited to the embodiments above, but may be implemented in various forms.

(3a) In the vehicle seat 1 of the above-described embodiments, the movable mechanisms 6, 16 may each be configured to support at least a part of the seat cushion 2 in a displaceable manner relative to the cushion frame 4.

(3b) In the vehicle seat 1 of the above-described embodiments, the restriction member that can restrict displacement of the two passive members need not be fixed to the cushion frame 4 or the back frame 5.

(3c) In the vehicle seat 1 of the above-described embodiments, the two springs may be different in spring constant, initial length, natural length, or other factors. In other words, the initial load F0 when the movable member starts displacement may be different between the displacement in the first direction D1 and the displacement in the second direction D2.

(3d) The vehicle seat 1 of the above-described embodiments may also be applied to a seat for use in any vehicles other than automobiles, such as railway vehicles, ships and boats, and aircrafts.

(3e) It may be possible to divide a function performed by one element in the above-described embodiments to a plurality of elements, or to integrate functions of a plurality of elements into one element. Also, the configurations in the above-described embodiments may be partly omitted. Further, at least a part of a configuration in the above-described embodiments may be added to, or may replace, another configuration of the above-described embodiments. Any form that falls within the scope of the technical ideas defined by the language of the appended claims may be an embodiment of the present disclosure.

What is claimed is:

1. A vehicle seat comprising:
   a seat cushion,
   a seatback,
   a frame supporting the seat cushion and the seatback, and
   a movable mechanism configured to support the seat cushion or the seatback so as to be displaceable relative to the frame,
   the movable mechanism comprising:
      a first spring and a second spring, each including a first end coupled to the frame;
      a movable member coupled to the seat cushion or the seatback and configured to be displaceable relative to the frame;
      a first passive member and a second passive member, a second end of the first spring being coupled to the first passive member and a second end of the second spring being coupled to the second passive member; and
      a restriction member configured to restrict displacement of the first passive member and the second passive member, wherein
   the movable member is configured to displace the first passive member in a first direction when the movable member is displaced from a movable-member initial position in the first direction, and to displace the second passive member in a second direction, which is opposite to the first direction, when the movable member is displaced from the movable-member initial position in the second direction,
   the restriction member is configured to restrict displacement of the first passive member from a first-passive-member initial position in the second direction, and to restrict displacement of the second passive member from a second-passive-member initial position in the first direction, and
   the restriction member is configured to restrict displacement of the first passive member and the second passive member by contacting the first passive member and the second passive member.

2. The vehicle seat according to claim 1,
   wherein the first spring is configured to expand due to the displacement of the first passive member from the first-passive-member initial position, and the second spring is configured to expand due to the displacement of the second passive member from the second-passive-member initial position.

3. The vehicle seat according to claim 1, wherein the restriction member is a part of the frame.

4. The vehicle seat according to claim 1, wherein
   the first spring is configured not to be deformed when displacement of the first passive member is restricted by the restriction member, and
   the second spring is configured not to be deformed when displacement of the second passive member is restricted by the restriction member.

5. The vehicle seat according to claim 1, wherein
   the first passive member and the second passive member are configured to move relative to the movable member.

6. The vehicle seat according to claim 1, wherein
   the first passive member is configured to move relative to the second passive member.

7. The vehicle seat according to claim 1, wherein
   an extendable shaft of the first spring and an extendable shaft of the second spring are parallel to the first direction and the second direction, respectively.

8. The vehicle seat according to claim 1, wherein
   the movable member comprises an opening, and the first passive member and the second passive member are configured to be slidably inserted in the opening of the movable member.

9. The vehicle seat according to claim 8, wherein,
   when the movable member is positioned at the movable-member initial position, the first passive member contacts the movable member at a first end of the opening in the first direction, and the second passive member contacts the movable member at a second end of the opening, the second end being opposite to the first end in the first direction.

10. The vehicle seat according to claim 9, wherein,
    when the movable member is displaced in the first direction, the second passive member is separated from the second end of the opening, and
    when the movable member is displaced in the second direction, the first passive member is separated from the first end of the opening.

11. The vehicle seat according to claim 1, wherein the first spring and the second spring are positioned such that an expansion axis of the first spring and an expansion axis of the second spring are coaxially aligned.

12. The vehicle seat according to claim 11, wherein the first passive member and the second passive member face each other.

13. The vehicle seat according to claim 1, wherein
    the restriction member contacts the first passive member and the second passive member when the movable member is positioned at the movable-member initial position.

14. The vehicle seat according to claim 13, wherein
    when the movable member is displaced in the first direction, the first passive member is separated from the restriction member, and the second passive member maintains contract with the restriction member, and
    when the movable member is displaced in the second direction, the first passive member maintains contact with the restriction member, and the second passive member is separated from the restriction member.

15. The vehicle seat according to claim 1, wherein
    the restriction member comprises two restriction members that are spaced from each other in a third direction perpendicular to the first direction so that the movable member is interposed between the two restriction members in the third direction.

16. The vehicle seat according to claim 1, wherein, when the movable member is positioned at the movable-member initial position, the first passive member and the second passive member contact the movable member,
    when the movable member is displaced in the first direction, the movable member is separated from the second passive member, and
    when the movable member is displaced in the second direction, the movable member is separated from the first passive member.

17. The vehicle seat according to claim 1, wherein the first passive member and the second passive member have a planer shape, and a major surface of the first passive member and a major surface of the second passive member face each other in the first direction.

* * * * *